(12) United States Patent
Hyde et al.

(10) Patent No.: US 10,929,734 B1
(45) Date of Patent: *Feb. 23, 2021

(54) RFID TAG CLOCK FREQUENCY REDUCTION DURING TUNING

(71) Applicant: Impinj, Inc., Seattle, WA (US)

(72) Inventors: John D. Hyde, Corvallis, OR (US); Shailendra Srinivas, Seattle, WA (US); Jay Kuhn, Seattle, WA (US); Ronald A. Oliver, Seattle, WA (US); Harley Heinrich, Snohomish, WA (US); Theron Stanford, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,866

(22) Filed: Oct. 10, 2019

Related U.S. Application Data

(63) Continuation of application No. 15/985,054, filed on May 21, 2018, now Pat. No. 10,445,535, which is a continuation of application No. 14/820,502, filed on Aug. 6, 2015, now Pat. No. 10,002,266.

(60) Provisional application No. 62/035,305, filed on Aug. 8, 2014.

(51) Int. Cl.
| | |
|---|---|
| *G06K 19/07* | (2006.01) |
| *G06K 7/01* | (2006.01) |
| *G06K 7/016* | (2006.01) |
| *G06K 7/10* | (2006.01) |

(52) U.S. Cl.
CPC ......... *G06K 19/0712* (2013.01); *G06K 7/016* (2013.01); *G06K 7/10148* (2013.01); *G06K 7/10198* (2013.01)

(58) Field of Classification Search
CPC .............. G06K 7/016; G06K 7/10148; G06K 19/0712; G06K 7/10198
USPC ...................................................... 340/10.1
See application file for complete search history.

(56) References Cited

U.S. PATENT DOCUMENTS

| | | |
|---|---|---|
| 5,537,029 A | 7/1996 | Hemminger et al. |
| 6,204,750 B1 | 3/2001 | Scheelen |
| 6,472,975 B1 | 10/2002 | Beigel et al. |
| 6,667,638 B1 | 12/2003 | Kramer et al. |
| 6,838,989 B1 | 1/2005 | Mays et al. |
| 6,940,467 B2 * | 9/2005 | Fischer .............. G06K 19/0701 340/10.1 |
| 6,950,009 B1 | 9/2005 | Nysen |
| 7,019,617 B2 | 3/2006 | Pratt et al. |

(Continued)

FOREIGN PATENT DOCUMENTS

KR 20080076325 A * 8/2008

*Primary Examiner* — Yong Hang Jiang
(74) *Attorney, Agent, or Firm* — Hertzberg, Turk & Associates, LLC

(57) ABSTRACT

An RFID IC may operate at a relatively low clock frequency while impedance matching to an antenna is being tuned to increase the amount of power that the IC can extract from an incident RF wave. A tuning circuit tunes the impedance matching by adjusting a variable impedance coupling the IC and the antenna. The IC may power-up with a low clock frequency or reduce its current clock frequency to a lower clock frequency prior to tuning or during the tuning process, and may increase its clock frequency upon completion of tuning or during the tuning process.

20 Claims, 11 Drawing Sheets

(56) References Cited

U.S. PATENT DOCUMENTS

| | | | |
|---|---|---|---|
| 8,077,012 B2 | 12/2011 | Batra et al. | |
| 8,138,892 B2 * | 3/2012 | Forster | G06K 19/0707 340/10.4 |
| 8,305,190 B2 | 11/2012 | Moshfeghi | |
| 2003/0095033 A1 * | 5/2003 | Amtmann | G06K 7/10198 340/10.1 |
| 2006/0068744 A1 * | 3/2006 | Maligeorgos | H03L 7/00 455/318 |
| 2007/0229270 A1 | 10/2007 | Rofougaran | |
| 2014/0073071 A1 | 3/2014 | Diorio et al. | |

* cited by examiner

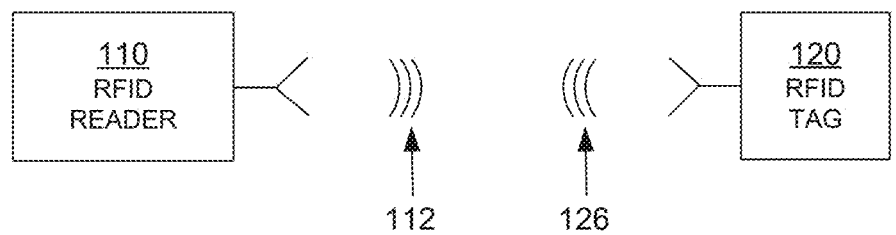
FIG. 1
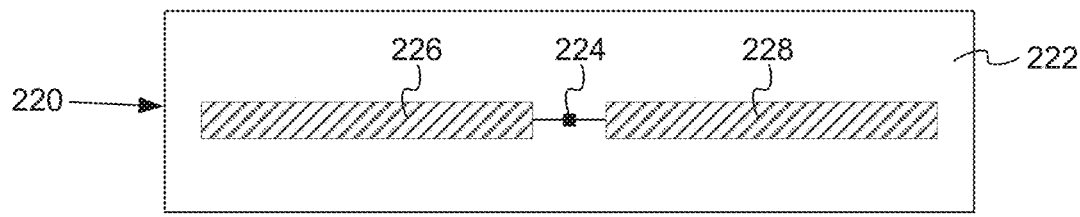
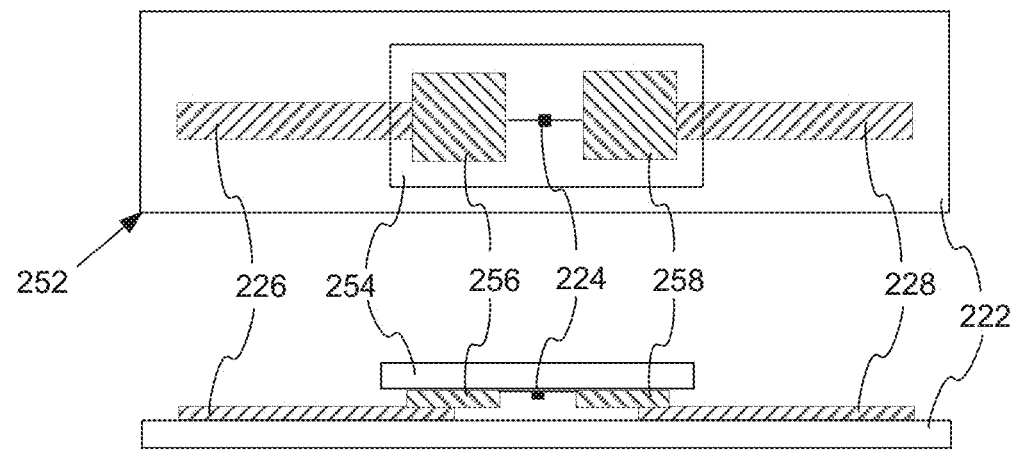
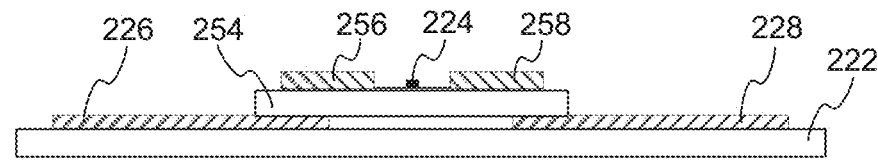
FIG. 2

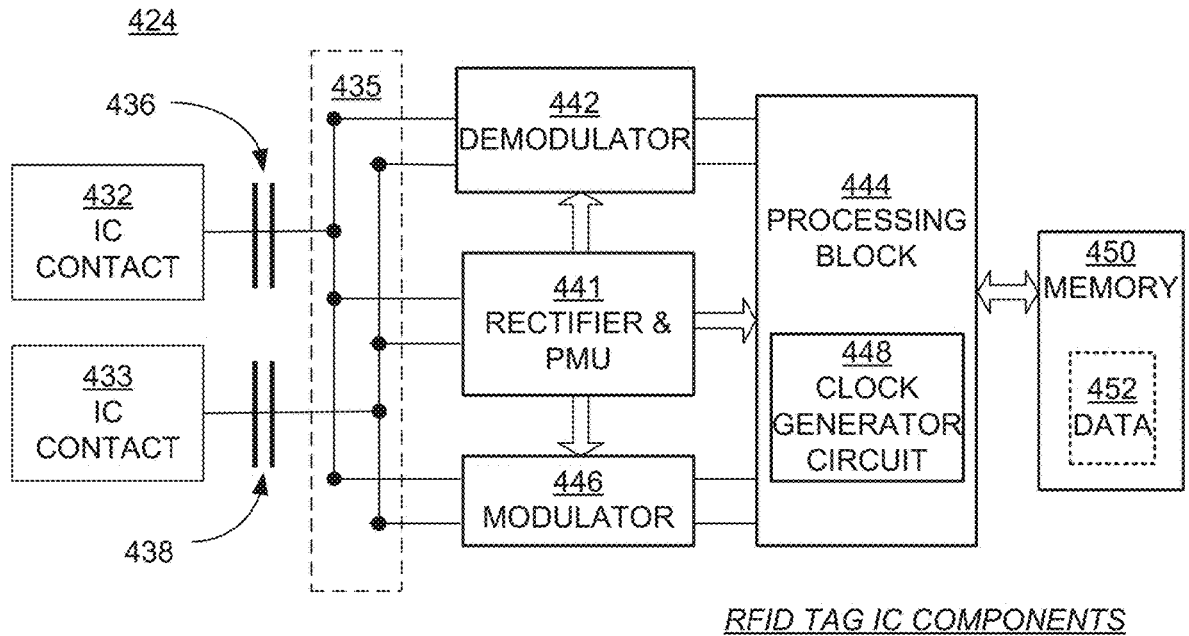
FIG. 4
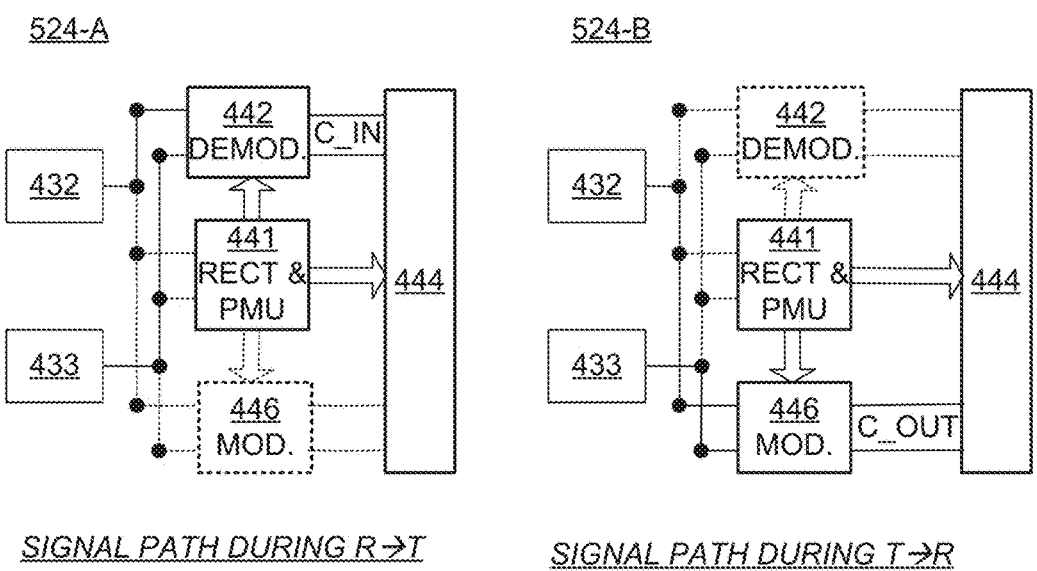
FIG. 5A   FIG. 5B

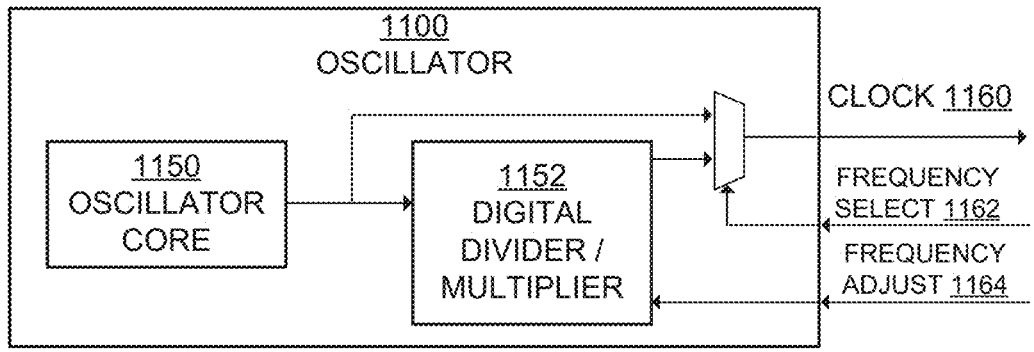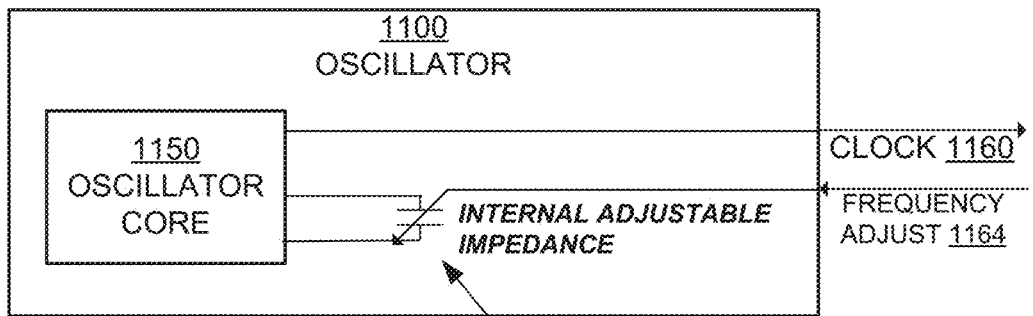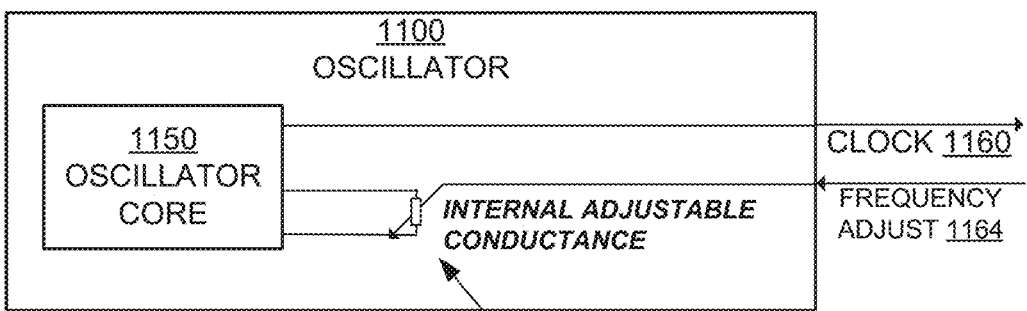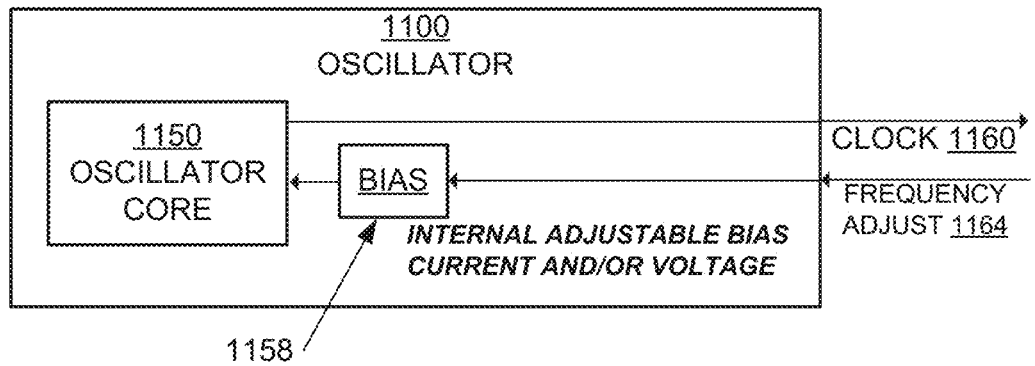
FIG. 11

RFID TAG CLOCK FREQUENCY REDUCTION DURING TUNING

CROSS REFERENCE TO RELATED APPLICATIONS

This Application is a continuation under 35 U.S.C. § 120 of U.S. patent application Ser. No. 15/985,054 filed on May 21, 2018, now U.S. Pat. No. 10,445,535, which is a continuation under 35 U.S.C. § 120 of U.S. patent application Ser. No. 14/820,502 filed on Aug. 6, 2015, now U.S. Pat. No. 10,002,266, which claims the benefit of No. 62/035,305 filed on Aug. 8, 2014. The disclosures of the aforementioned U.S. Patent Application and the U.S. Provisional Application are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

An RFID tag may include a matching network coupled between the tag IC and the tag antenna and configured to match the input impedance of the tag IC to the impedance of the tag antenna. Matching the tag IC input impedance to the tag antenna impedance may improve power transfer from RF signals incident on the antenna to the IC. However, antenna and IC impedances may vary based on, for example, environmental conditions or IC processing. Accordingly, a matching network that matches antenna and IC impedances for one tag and one frequency in a particular environment may not match antenna and IC impedances for a different tag, different frequency, and/or different environment.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID IC operating at a relatively low clock frequency while impedance matching to an antenna is being tuned to vary the amount of power that the IC can extract from an incident RF wave. A tuning circuit tunes the impedance matching by adjusting a variable impedance coupling the IC and the antenna. The IC may power-up with a low clock frequency or reduce its current clock frequency to a lower clock frequency prior to tuning or during the tuning process, and may increase its clock frequency upon completion of tuning or during the tuning process.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID integrated circuit (IC).

FIGS. 5A and 5B illustrate signal paths during tag-to-reader and reader-to-tag communications in the block diagram of FIG. 4.

FIG. 11 illustrates several examples of circuitry for adjusting tag clock frequency according to some embodiments.

DETAILED DESCRIPTION

Figure 3:
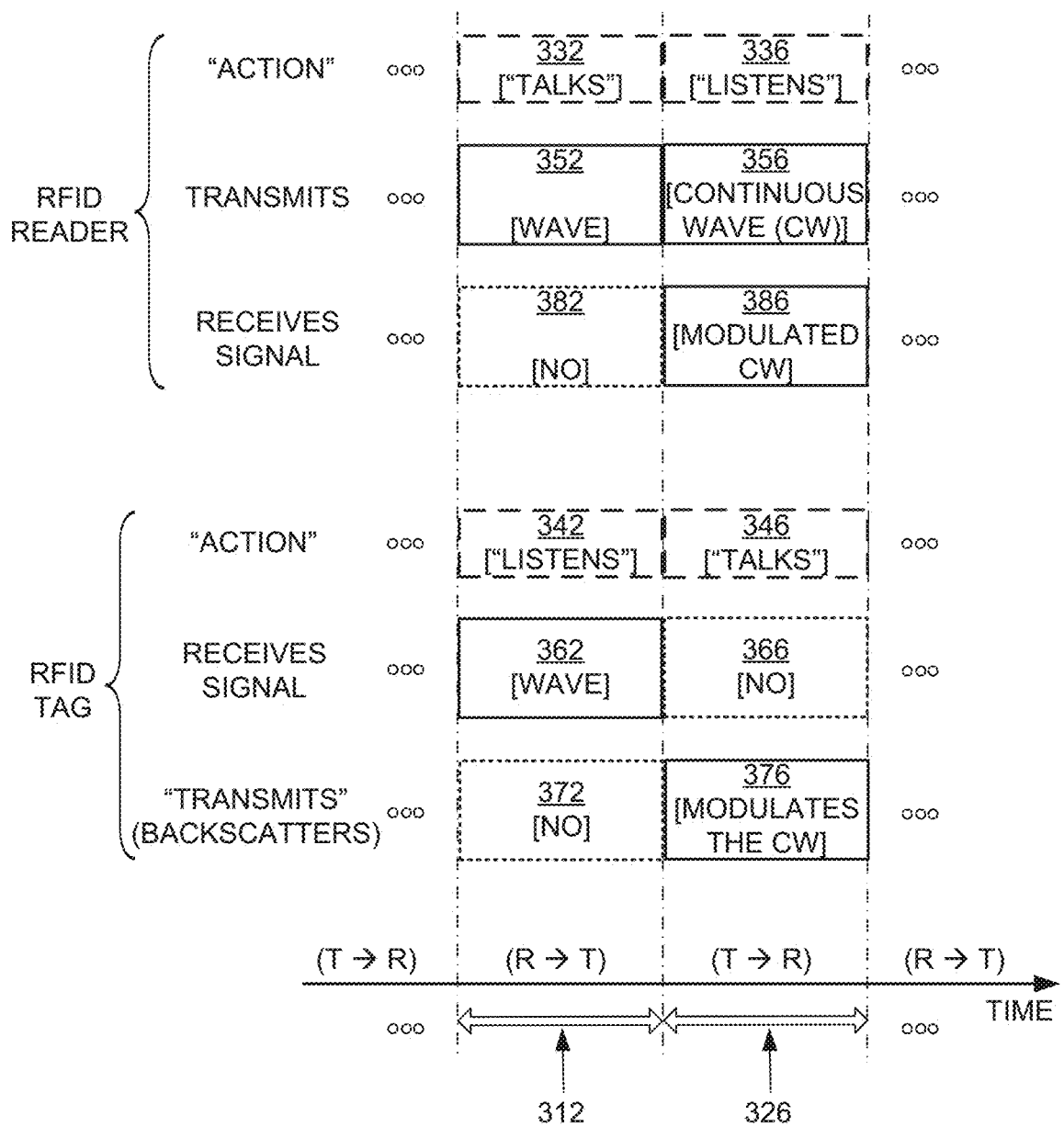
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), which defines communication parameters between RFID readers and tags in the wireless frequency range between 860 MHz and 960 MHz, inclusive. Versions 1.2.0 and 2.0 of the Gen2 Specification are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432 and 433, suitable for coupling to antenna segments such as antenna segments 226/228 of RFID tag 220 of FIG. 2. When two IC contacts form the signal input from and signal return to an antenna they are often referred-to as an antenna port. IC contacts 432 and 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432 and 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on. In some embodiments, circuit 424 may include a clock generator circuit 448 that generates a clock signal that may be used by processing block 444 and/or other blocks. The clock generator circuit 448 may include one or more oscillators, each configured to generate a clock signal with a particular frequency.

Circuit 424 additionally includes a modulator 446 that modulates an output signal generated by processing block 444. The modulated signal is transmitted by driving IC contacts 432 and 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432 and 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432 and 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Passive RFID tags rely on energy extracted from an RF wave to power the tag IC. In general, the efficiency of the RF power transfer from an RFID reader to a passive tag's IC directly affects the operational range of the RFID system. Accordingly, an RFID tag may include a matching network coupled between the IC and the antenna for matching the antenna impedance to the IC input impedance, thereby maximize power transfer to the IC. This matching network may employ discrete elements such as capacitors or inductors, or may be formed by the design of the antenna itself, and may be part of the antenna, part of the IC, part of both, or a standalone component. To ensure that as much of the RF power incident on the antenna is transferred to the IC, the source (antenna) impedance should be the complex conjugate of the load (IC) impedance. In some situations, antenna impedance may vary with environmental conditions such as humidity, substrate material, dielectric materials near the tag, etc. Similarly, IC impedance may vary with the processing of the IC itself. A matching network that matches antenna and IC impedances for one tag and one frequency under one condition may not match antenna and IC impedances for another IC at another frequency under a different condition. When the impedances vary the matching between the antenna and IC degrades, tag sensitivity degrades, and the operational range of the RFID system may be reduced.

Figure 6:
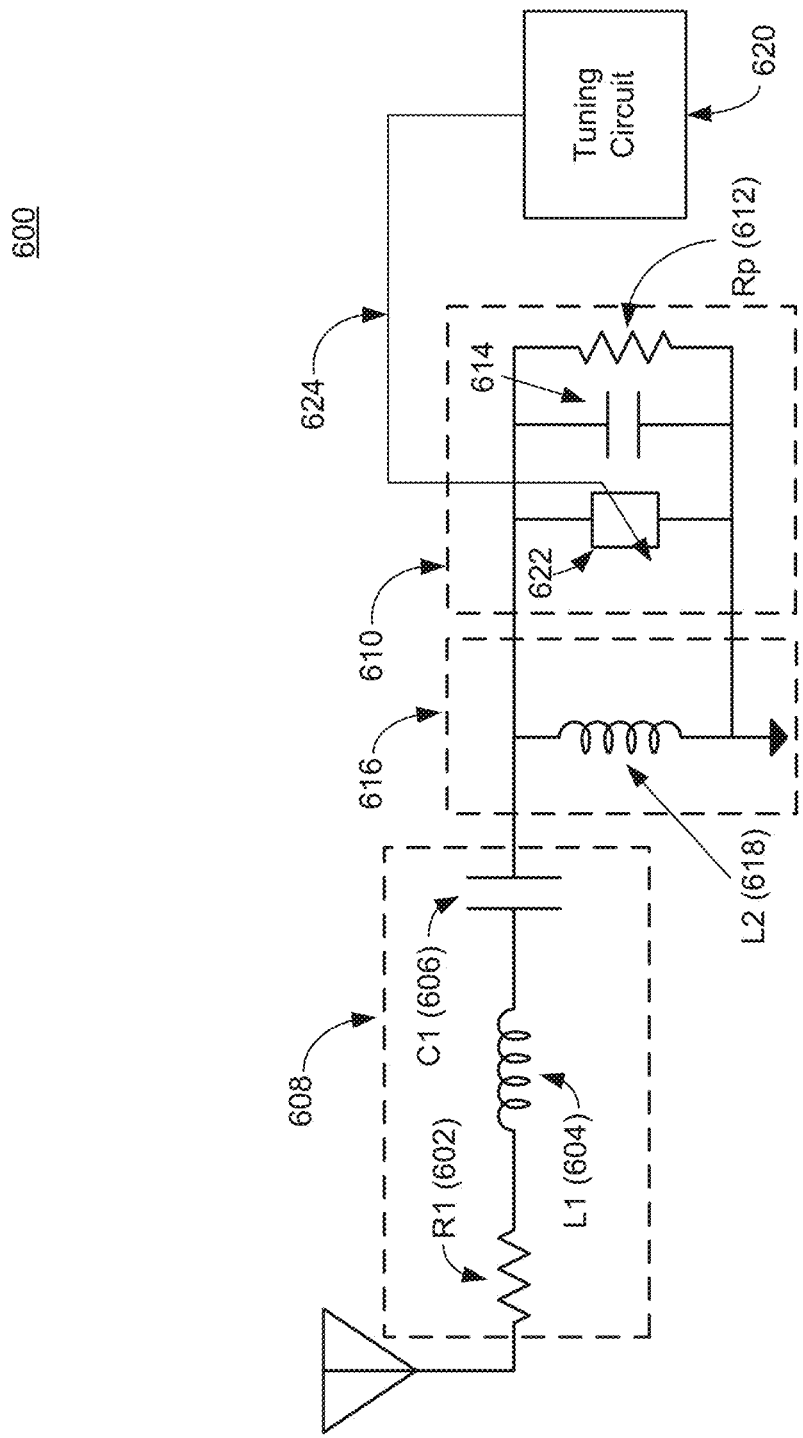
FIG. 6 depicts an RFID tag front-end equivalent circuit including a tuning circuit.

FIG. 6 is a diagram of an RFID tag front-end equivalent circuit 600 including a tuning circuit 620. RFID tag front-end equivalent 600 models the various impedances of an RFID tag and includes antenna section 608, IC input section 610, and matching network 616 that couples antenna section 608 to IC input section 610. Antenna section 608 includes inductor L1 604 and capacitor C1 606, which model the reactive portion of the antenna impedance, and resistor R1 602, which models the real portion of the antenna impedance. IC input section 610 includes a resistor Rp 612 that models the input resistance of the IC, a capacitor Cp 614 that models the input reactance of the IC, and a tuning element 622 coupled to tuning circuit 620 via tuning control interface 624. Tuning circuit 620 and/or tuning control interface 624 may be part of the IC and/or external to the IC. Matching network 616 includes inductor L2 618 that models the inductance of matching network 616.

To maximize power transfer between the antenna and IC in equivalent circuit 600, the reactance of inductor L1 604 should be the complex conjugate of the reactance of capacitor C1 606, and the reactance of inductor L2 618 should be the complex conjugate of the reactance of IC input section 610. In this "matching" situation the equivalent circuit 600 reduces to the resistors R1 602 and Rp 612 in series.

Typical matching networks use components with static values, and therefore can only maximize power transfer and extraction for particular values of antenna and IC impedance. However, antenna and IC impedance values can vary greatly. For example, RFID tags often operate over a range of frequencies. Because antenna and IC impedances vary as a function of frequency, a matching network that is configured for maximum power transfer at one frequency may not maximize power transfer at a different frequency.

Other factors may also cause impedance variations and degrade power transfer. Statistical variations in component values during manufacturing may cause the actual antenna and IC impedances to differ from their designed values. Similarly, the environment in which the tag operates (e.g., operating medium such as air, water, etc., or environmental conditions such as temperature, humidity, time, pressure, etc.) or the dielectric properties of an item to which the tag is attached may alter the effective antenna impedance. Consequently, designing a matching network with static-valued components involves design compromises that typically provide good power-conversion efficiency in some circumstances but lower efficiency in other circumstances.

In contrast, the impedance of tuning element 622 in circuit 600 can be adjusted using tuning circuit 620 (via tuning control interface 624). If there is an impedance mismatch between antenna 608 and IC 610 then tuning circuit 620 can adjust or tune tuning element 622 to compensate. In some embodiments, tuning circuit 620 may tune the tuning element 622 by determining peak voltages or extracted power for different impedance settings of tuning element 622, comparing the measurements to determine the impedance setting corresponding to the highest peak voltage or extracted power, then setting tuning element 622 based on the determined impedance setting. In other embodiments, instead of determining the impedance setting corresponding to the highest peak voltage or extracted power, tuning circuit 620 may determine the impedance setting corresponding to a peak voltage or extracted power at least sufficient to power IC 610.

Tuning circuit 620 in circuit 600 can be a standalone circuit or it can be integrated into an IC circuit block, such as one of the blocks in IC 424 of FIG. 4. In some embodiments, tuning circuit 620 may include a peak identifier module for identifying peak voltages for different impedance values of tuning element 622, an accumulator bank for storing temporary tuning information, such as peak voltages and associated impedance settings for tuning element 622, and/or a controller for receiving inputs and providing control signals to tuning element 622, the peak identifier module, and/or the accumulator bank.

Tuning element 622 may be implemented as a continuously variable element (e.g., a resistor, capacitor, or inductor) or as one or more switched elements (e.g., resistors, capacitors, and/or inductors). Of course, as will be apparent to one of ordinary skill in the art, tuning element 622 can include one or more variable capacitor(s), variable inductor(s), variable-length transmission line(s), variable resistors, etc. Any of these elements can be continuously variable or discretely variable (i.e. switched). For example, tuning element 622 may include one or more switched capacitors, switched inductors, switched transmission lines, and/or switched resistors. In some embodiments, tuning element 622 may only provide resistive components (i.e., no capacitors, inductors, or transmission lines). In one embodiment tuning element 622 may be an array of two or more switchable capacitors, at least two of which differ in capacitance, which may be adjusted by tuning circuit 620. For example, tuning element 622 may include four switchable capacitors, two having a first capacitance and the other two having a second capacitance, or each having different capacitances.

In some embodiments, tuning circuit 620 is operable at an RF power level lower than that needed to operate the rest of the tag IC. For example, suppose that an RFID tag without tuning circuit 620 receives incident RF power sufficient to power the tag IC, but suffers from an impedance mismatch between the antenna and the IC such that the antenna does not transfer enough power to the IC to enable operation. In this case the incident RF field must be increased to enable the IC to operate. Now suppose that the tag is equipped with tuning element 622 and with tuning circuit 620. Further suppose that tuning circuit 620 is able to operate at an incident RF power level below the threshold for IC operation. In this case the tuning circuit can power-up and adjust tuning element 622 to reduce the impedance mismatch and improve power transfer between the antenna and the IC, thereby allowing the IC to extract enough power from the incident RF wave to operate.

Figure 7:
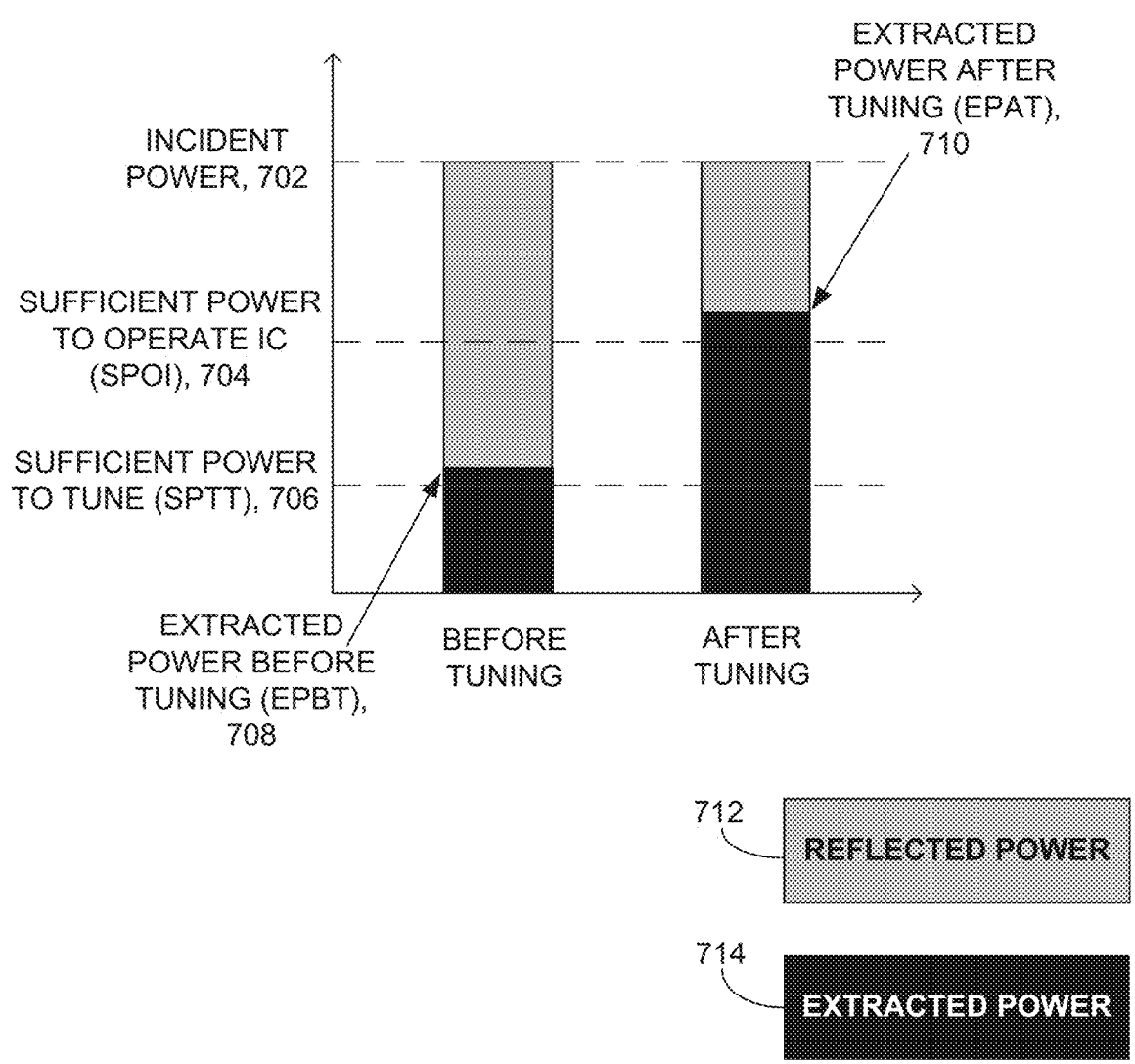
FIG. 7 illustrates the amount of power extracted and lost before and after tuning according to embodiments.

FIG. 7 is a chart 700 depicting power extracted (represented by black, 714) by an RFID IC and power lost (represented by gray, 712) by the IC during a tag tuning process. Power may be lost via reflection due to an impedance mismatch or due to resistive losses within the antenna, matching network, and/or IC. The vertical axis of chart 700 measures power and the horizontal axis shows two time periods: before the tuning process (left) and after the tuning process (right).

The RF power incident on the tag is the same for both time periods, as shown by incident power indicator 702. The IC may require a minimum amount of extracted power to fully operate, as indicated by the "sufficient power to operate IC" (or SPOI) requirement 704. The IC may fully operate when it has sufficient power to enable substantially all of its components to operate, or when it has sufficient power to receive and respond to reader commands according to a communication protocol such as the Gen2 protocol. The tuning circuit (e.g., tuning circuit 620), on the other hand, may require a different, smaller amount of extracted power to operate, as indicated by the "sufficient power to tune" (or SPTT) requirement 706. Before tuning, much of the incident power is reflected and lost (represented by gray). As a result, the extracted power before tuning (EPBT) 708, representing the power extracted by the IC before the tuning circuit operates, may be insufficient to meet SPOI requirement 704, and the IC may not have sufficient power to fully operate. However, the EPBT 708 is sufficient to meet the SPTT requirement 706, and the tuning circuit may have sufficient power to operate.

During operation, the tuning circuit may adjust a variable impedance (e.g., variable impedance 622) to improve impedance matching between the antenna and the IC, thereby increasing the efficiency of the power extraction process (defined as the ratio of power extracted to total incident power) and improving the power transfer between the antenna and IC. For example, as described above, the tuning circuit may measure peak voltages or extracted power for different impedance settings of the variable impedance, compare measurements to determine impedance settings corresponding to the highest peak voltage/extracted power or a peak voltage/extracted power sufficient to meet SPOI requirement 704, and then use the determined impedance setting(s) to set the variable impedance. As a result of the increased power extraction efficiency, the extracted power after tuning (EPAT) 710, representing the power extracted by the IC after the tuning circuit operates, is larger than EPBT 708, and is at least equal to the SPOI requirement 704. Accordingly, the IC may have sufficient power to fully operate even though the incident power 702 remains unchanged.

Figure 8:
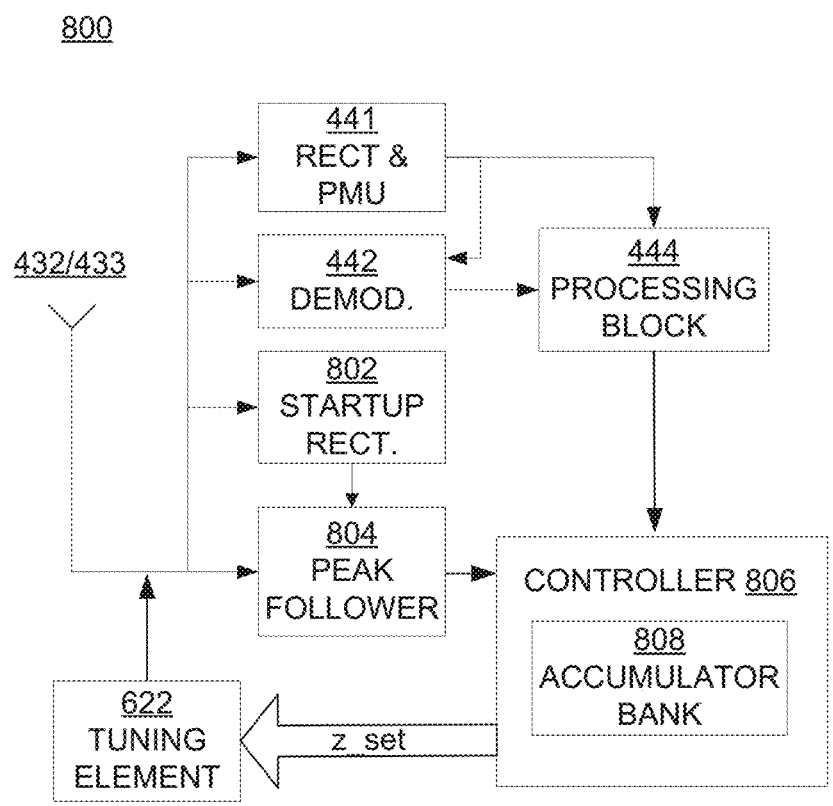
FIG. 8 is a block diagram showing how a tuning circuit may be implemented in an RFID tag.

In some embodiments, tuning circuit 620 may operate by varying the impedance value of tuning element 622, thereby varying the power extracted from an incident RF wave. Tuning circuit 620 may then detect the peak voltage at or power transferred to the IC at the different impedance settings and set tuning element 622 to the impedance value that provides the highest peak voltage/power transferred. FIG. 8 is a block diagram showing how a tuning circuit such as tuning circuit 620 may be implemented in an RFID tag 800.

Portions of tag 800 are similar to circuit 424 in FIG. 4 and equivalent circuit 600 in FIG. 6, with similar components numbered similarly. Tag 800 implements a tuning circuit (similar to tuning circuit 620) that may include a startup rectifier 802, a peak follower 804, and a controller 806. Each of these components may be integrated into the tag IC, built on the tag 800, or be a standalone component attached to the tag 800. The startup rectifier 802 may be configured to provide power to the peak follower 804, controller 806, and/or tuning element 622. In some embodiments, components for matching tag IC/antenna impedance are configured to operate at a lower input power/voltage than components on the rest of the tag, so that tag impedance can be adjusted even if it is mismatched such that the received power is insufficient to operate other tag components.

The peak follower 804 is configured to identify the peak voltage for a given impedance value for tuning element 622. In some embodiments, the peak follower 804 includes a carrier peak detector (or "envelope detector") and/or an envelope peak detector (or "slicer peak detector"). Using the carrier peak detector ("envelope detector") as the peak follower 804 in some circumstances may be preferable due to higher bandwidth and better noise filtering/interference rejection. Also, the demodulator block 442 may itself include a carrier peak detector (used to recover the modulation envelope in normal tag operation), and this carrier peak detector can be used for impedance matching instead of the peak follower 804.

The controller 806, which may implement tuning circuit 620, is configured to receive detected peak voltage from the peak follower 804, store peak information in an accumulator bank 808, and provide an impedance control signal (e.g., via tuning control interface 624) to the tuning element 622 to vary its impedance. The impedance control signal may include a desired impedance for tuning element 622 or a setting for tuning element 622 corresponding to the desired impedance. Tuning element 622 in turn adjusts the network impedance matching between the tag antenna (connected to antenna contacts 422 and 423) and the rest of the tag based on the received impedance control signal, thereby varying the power extracted from a coupled antenna.

In some embodiments, tag 800 implements an analog filter stage (not shown) including one or more capacitors or inductors. The analog filter stage may be placed before peak follower 804, and may be configured to reduce noise due to interference in a received signal, so that the peak follower 804 detects an actual peak voltage associated with the incoming signal rather than a spurious peak voltage associated with noise or interference in the incoming signal. In some embodiments, the analog filter stage is implemented using elements (e.g., capacitors or inductors) that may be reused after the tuning process. For example, the analog filter stage may include a capacitor that can then be reused for energy storage for other RFID IC operations.

Figure 9:
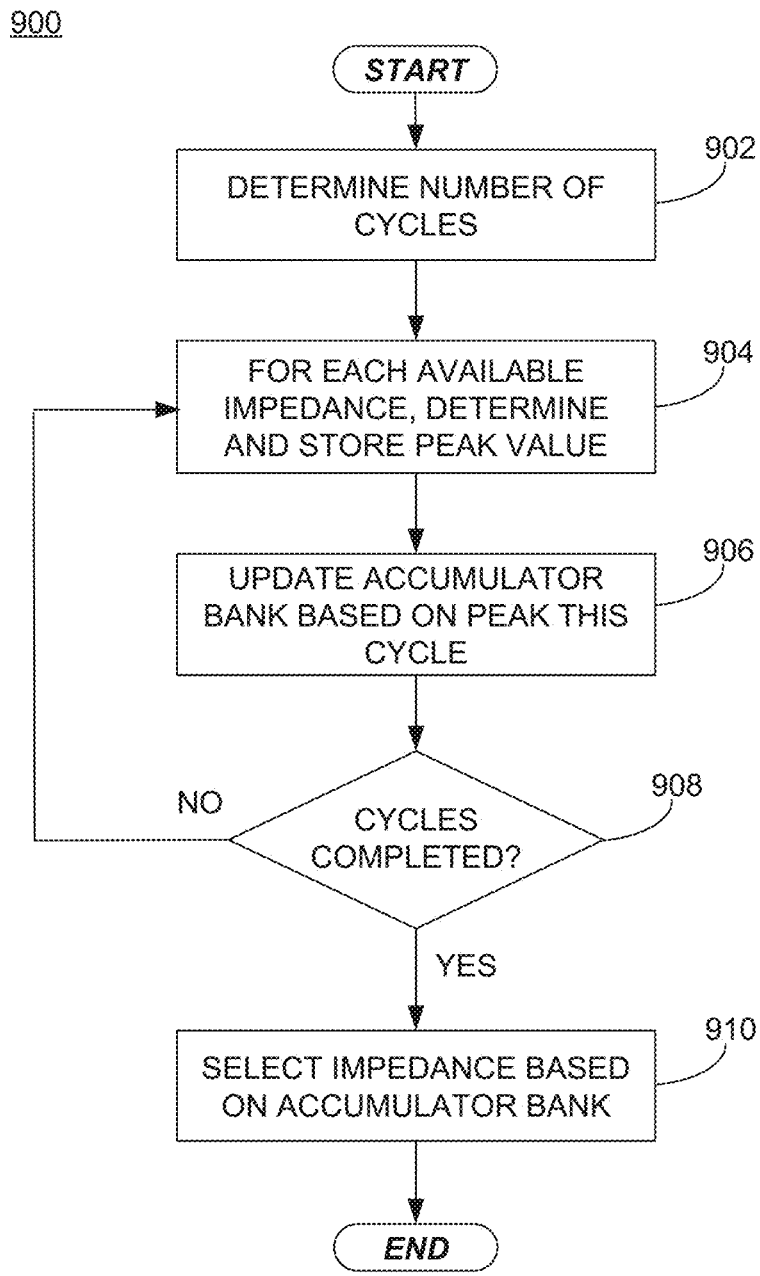
FIG. 9 is a flowchart depicting a process for tuning impedance matching between an RFID IC and a tag antenna.

FIG. 9 is a flowchart depicting a process 900 for tuning impedance matching between an RFID IC and a tag antenna. Process 900 may iterate repeatedly through available tuning element impedance values to determine the impedance value that provides the highest input peak voltage. In other embodiments, process 900 may also (or instead) determine the impedance value that provides the highest total input power.

In step 902, the number of impedance iteration cycles is determined. For example, the controller 806 or the IC may determine the number of cycles dynamically, or the number of cycles may be a predetermined value. In step 904, the controller 806 determines and store the peak input voltage value for each available tuning element impedance value. In some embodiments, the controller 806 may use filtering (e.g., averaging, integration, etc.) to reject noise and/or interference while determining the peak input voltage values. For example, the controller 806 may use n analog filter stage as described above. In some embodiments, the controller 806 may not treat a detected peak input voltage value as an actual peak unless the value exceeds some threshold determined based on potential noise or interference. Subsequently, in step 906, the controller 806 updates accumulator bank 808 based on the stored peak input voltage values determined in step 904. For example, the accumulator bank 906 may include a number of registers at least equal to the number of available tuning element impedance values or corresponding tuning element settings. The controller 806 may compare the stored voltage values determined in step 904 to determine the impedance value that provided the highest peak input voltage value. The controller 806 may then increment the value of the register in the accumulator bank 808 that corresponds to the determined impedance value. In some embodiments, instead of storing the actual voltage values, the controller 806 instead stores a rank for each available tuning element impedance value.

Subsequently, in step 908, the controller 806 determines if the number of times it has iterated through the available impedance values has reached the number of cycles determined in step 902. If not, the controller 806 returns to step 904. If so, in step 910 the controller 806 selects a desired impedance value based on the accumulator bank 808. For example, the value of an accumulator in the bank 808 may indicate the number of times its corresponding impedance value was determined to result in the highest peak voltage. Accordingly, the controller 806 may determine the accumulator with the largest value and select the impedance value corresponding to that accumulator.

Figure 10:
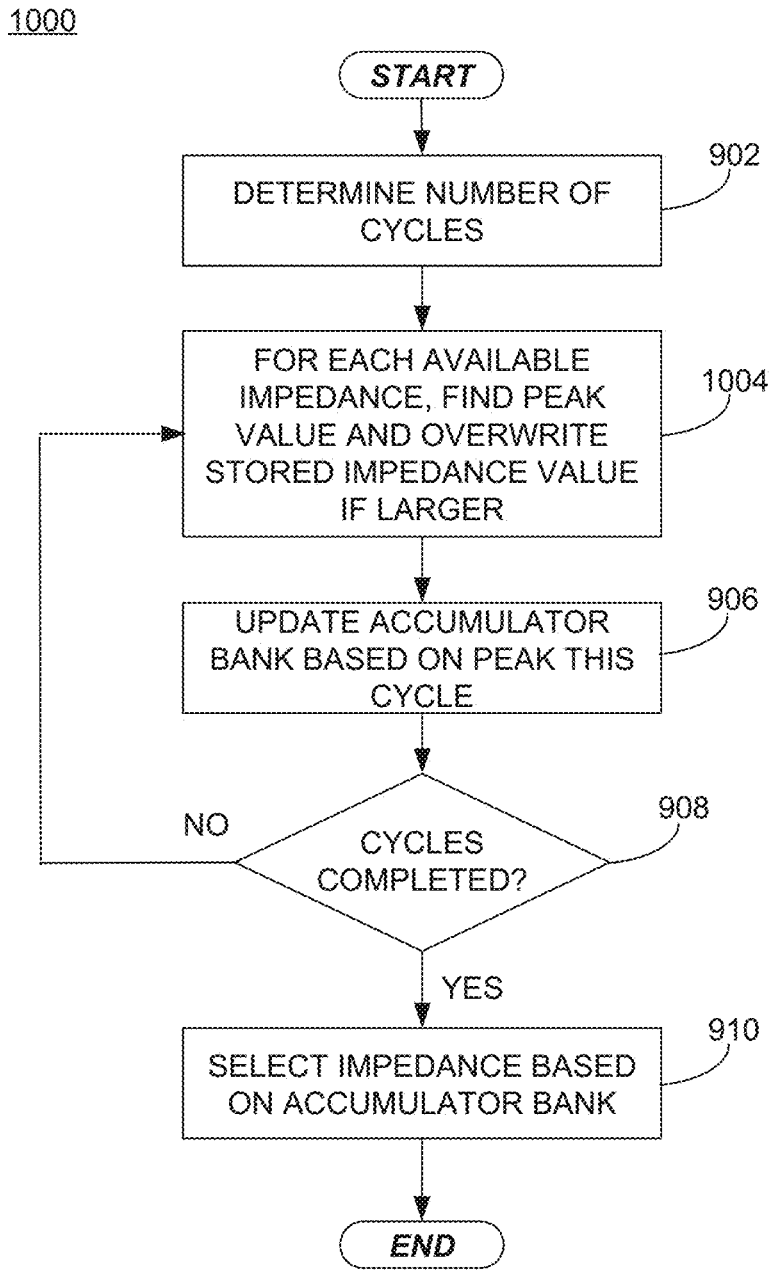
FIG. 10 is a flowchart depicting another process for tuning impedance matching between an RFID IC and a tag antenna.

FIG. 10 is a flowchart depicting another process 1000 for tuning impedance matching between an RFID IC and a tag antenna. Process 1000 is similar to process 900, with similarly-numbered steps behaving similarly. However, in step

1004, instead of storing peak voltage values for every available impedance value, the controller 806 only stores the highest peak voltage value and the associated tuning element setting (which may also be referred to as the impedance setting) for the impedance value in that cycle. For example, when the controller 806 begins iterating through the available impedance values, it may store the first impedance setting and its associated peak voltage value (which is by default the highest in the current cycle). Subsequently, if another impedance value provides a higher peak voltage value, the controller 806 overwrites the stored data with the impedance setting corresponding to the new impedance value and its higher peak voltage. On the other hand, if another impedance value does not provide a higher peak voltage value than the impedance value corresponding to the stored impedance setting, the controller 806 will not overwrite the stored data. Thus, only one impedance setting and corresponding peak voltage value is stored, instead of all available impedance settings and their peak voltage values. In some embodiments, controller 806 moves to step 906 even if all available impedance values have not been iterated through. For example, if the stored data has not been overwritten for the last one, two, or more impedance values checked, the controller 806 may determine that the peak for this cycle has been found, and stop iterating through the rest of the available impedance values. In some embodiments, the controller 806 waits until the stored data has not been overwritten for the last two impedance values checked, to avoid distortion caused by noise/interference.

In processes 900 and 1000, a controller or tuning circuit attempts to tune impedance matching by iterating through a number of different impedance settings. The impedance setting iteration process may be performed in several different ways. For example, each of the different impedance settings may correspond to a particular value of a counter. The sequence of counter values may directly correspond to the sequence of impedance settings, with lower counter values corresponding to lower impedance settings and vice-versa, or the counter values may relate to the impedance settings in some other way. In the former situation, the controller may be configured to iterate through the different impedance settings by starting at a particular default counter value (corresponding to a particular default impedance setting) and determining and/or storing the peak voltage value for the default counter value. The controller may then successively increment through counter values and their corresponding impedance settings. In some embodiments, the controller may determine and/or store peak voltage values for each impedance setting incremented through. In other embodiments, the controller may not determine and/or store peak voltage values for one or more of the impedance settings. For example, the controller may skip determining peak voltage values for one or more impedance setting to reduce the risk of power loss or controller reset due to insufficient power. In this situation, the controller may quickly increment through counter values corresponding to impedance settings with undetermined peak voltage values in order to reach a counter value corresponding to an impedance setting with a known peak voltage value sufficient for IC tuning operations.

If the controller reaches a maximum counter value (corresponding to a maximum impedance setting), the controller may cause the counter to roll over to its minimum counter value (corresponding to a minimum impedance setting) and then continue to increment until the default counter value is reached. Of course, instead of incrementing the controller may successively decrement through counter values, and may cause the counter to roll over to its maximum counter value if a minimum counter value is reached and continue decrementing.

In some embodiments, after causing the counter to roll over to its minimum or maximum value and continuing to increment or decrement, the controller may stop incrementing/decrementing the counter, thereby stopping the tuning process. The controller may stop the tuning process upon reaching the default impedance setting or reaching a stored impedance setting corresponding to the highest peak voltage value observed. In some embodiments, the controller may stop incrementing/decrementing the counter immediately after causing the counter to roll over to its minimum or maximum value.

In some embodiments, a tag IC may be configured to operate at a relatively low clock frequency during the impedance matching tuning process or phase. A tag IC's clock frequency determines how quickly components in the tag IC operate. A relatively high clock frequency causes IC components to operate more quickly, whereas a relatively low clock frequency causes IC components to operate more slowly.

In some embodiments, a relatively high clock frequency may be necessary for a tag IC to operate according to a protocol. For example, a protocol such as the Gen2 Specification mentioned above may require that a reader or tag be capable of transmitting and/or receiving RF signals having particular minimum symbol rates and timing parameters during reader-tag communications. A tag IC may then need to operate at a minimum clock frequency or a clock frequency higher than the minimum clock frequency in order to receive, process, and reply to reader commands according to the protocol. This minimum clock frequency may be referred to as a "minimum clock frequency to operate according to a protocol" (MFOP).

Clock frequency is also directly related to IC power consumption. An IC operating at a higher clock frequency tends to consume more power than the same IC operating at a lower clock frequency. Configuring a tag IC to operate at a relatively low clock frequency (for example, less than about 600 kHz) during an impedance matching tuning phase may make more power available for the tuning process due to lower power consumption by other IC components (i.e., components other than tuning circuit 620 and tuning element 622). The clock frequency used during an impedance matching tuning phase may be lower than the MFOP. Configuring a tag IC to operate at a low clock frequency may also allow the tag IC to perform some limited non-tuning functions during the tuning process. This may be preferable to leaving the tag IC off or unpowered during the tuning process. Subsequently, after the tuning process is complete and more power is available, the tag IC may then increase its clock frequency. For example, the tag IC may increase its clock frequency to be greater than or equal to the MFOP in order to operate in a protocol phase, in which it receives and responds to reader commands according to a protocol.

FIG. 11 illustrates several examples of circuitry for adjusting tag clock frequency according to some embodiments. Diagram 1102 depicts an example of an oscillator 1100 (e.g., an oscillator present in clock generator circuit 448) where the frequency of output clock signal 1160 may be adjusted by using a digital divider/multiplier 1152. When an unmodified output clock frequency is desired, frequency select signal 1162 may cause the direct output of oscillator core 1150 to be selected as output clock signal 1160. When the output clock frequency is to be adjusted, frequency select signal 1162 may cause an output of digital divider/multiplier 1152 to be selected as output clock signal 1160. In some embodiments, digital divider/multiplier 1152 may receive the direct output of oscillator core 1150 and generate a reduced-frequency output signal from the direct output by dividing the frequency of the direct output based on a divider ratio. Digital divider/multiplier 1152 may select the divider ratio to use based on frequency adjust signal 1164, which may be received from a tag controller or a tuning circuit. In some embodiments, digital divider/multiplier 1152 may instead generate an increased-frequency output signal from the received direct input by multiplying the frequency of the direct output. For example, digital divider/multiplier 1152 may multiply the frequency of the direct output based on a multiplier selected based on frequency adjust signal 1164.

Diagram 1104 depicts another example of oscillator 1100. In diagram 1104, oscillator core 1150 is directly coupled to output clock signal 1160 and internal adjustable impedance 1154. The frequency of the output signal of oscillator core 1150 and hence output clock signal 1160 may be related to the impedance value of adjustable impedance 1154. Frequency adjust signal 1164 may adjust the impedance of internal adjustable impedance 1154, thereby tuning the frequency of the output of oscillator core 1150 and the output clock signal 1160. For example, frequency adjust signal 1164 may cause capacitors in the adjustable impedance 1154 to be switched in and out, as described below in relation to FIG. 12, or may cause the capacitance of one or more capacitors in the adjustable impedance 1154 to be adjusted. In some embodiments, the adjustable impedance 1154 may include one or more adjustable inductances in addition to or instead of capacitors/adjustable capacitances. In these embodiments, frequency adjust signal 1164 may adjust the adjustable inductances to tune the frequency of output clock signal 1160.

Diagram 1106 depicts yet another example of oscillator 1100. In diagram 1106, oscillator core 1150 is directly coupled to output clock signal 1160 and internal adjustable conductance 1156. The frequency of the output signal of oscillator core 1150 and hence output clock signal 1160 may be related to the conductance (or equivalently resistance) of adjustable conductance 1156. Similar to the example depicted in diagram 1104, frequency adjust signal 1164 may adjust the conductance of internal adjustable conductance 1156, thereby tuning the frequency of output clock signal 1160. For example, frequency adjust signal 1164 may cause resistors in the adjustable conductance 1156 to be switched in and out, or may cause the resistance/conductance of one or more elements in the adjustable conductance 1156 to be adjusted.

Diagram 1108 depicts another example of an oscillator 1100. In diagram 1108 oscillator core 1150 is directly coupled to output clock signal 1160, and is biased by internal current/voltage bias element 1158. The frequency of the output signal of oscillator core 1150 and hence output clock signal 1160 may be related to the current and/or voltage biasing supplied by bias element 1158. Frequency adjust signal 1164 may cause the biasing provided by bias element 1158 to change, thereby adjusting the frequency of output clock signal 1160.

In some embodiments, the methods for adjusting oscillator output frequency described above may be combined. For example, an oscillator may include two or more of a digital divider/multiplier, an adjustable internal impedance, and an adjustable internal conductance, and the oscillator output frequency may be adjusted by adjusting the two or more included components. In other embodiments, multiple oscillators, each providing output signals at different frequencies, may be used to supply clock signals of different frequencies. For example, a first oscillator may be configured to supply a relatively-low-frequency clock signal, while a second, different oscillator may be configured to supply a relatively-high-frequency clock signal. In some embodiments, at least one oscillator may be adjustable as described in FIG. 11, while at least one other oscillator may not be adjustable. For example, a first oscillator configured to supply a relatively-low-frequency clock signal may not be adjustable, whereas a second oscillator configured to supply a relatively-high-frequency clock signal may be adjustable.

Figure 12:
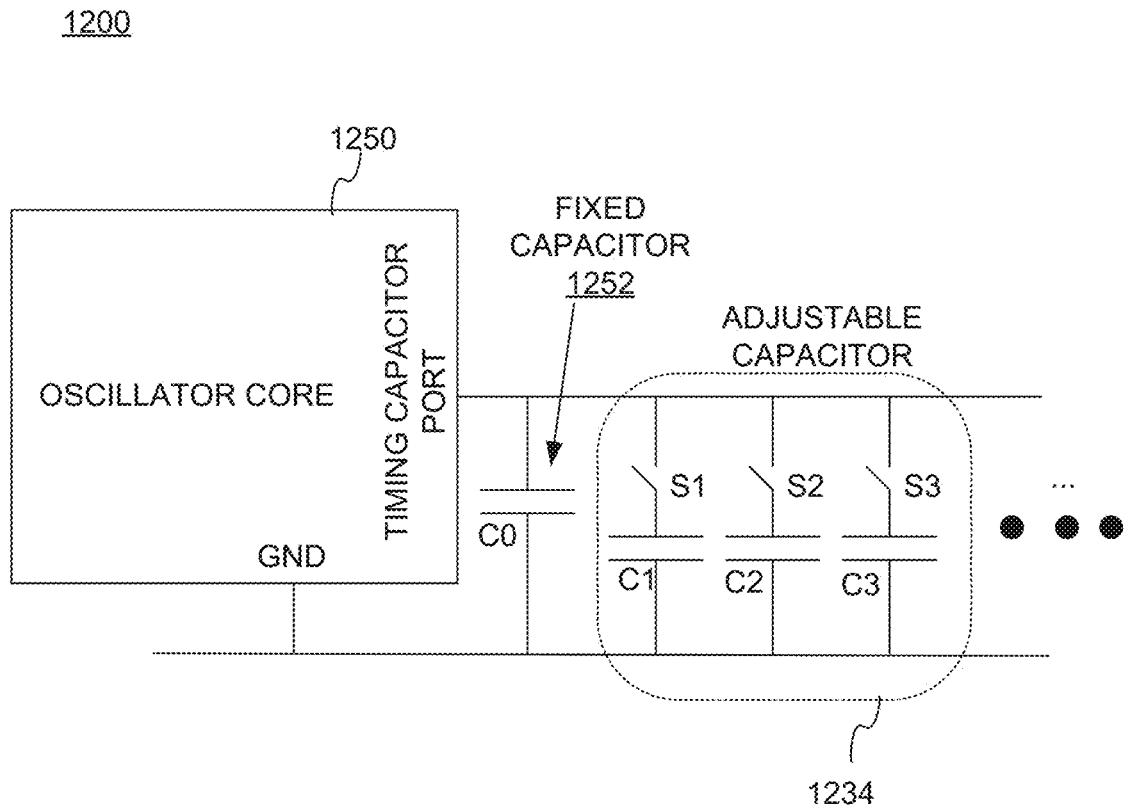
FIG. 12 illustrates another example of circuitry for adjusting tag clock frequency according to one embodiment.

FIG. 12 illustrates another example of circuitry 1200 for adjusting tag clock frequency according to one embodiment. Circuitry 1200 includes oscillator core 1232, which may be coupled to a parallel combination of fixed capacitor 1252 and adjustable capacitor 1234. In some embodiments, adjustable capacitor 1234 is formed by one or more capacitors (capacitors C1, C2, C3, etc.) that can be coupled to or decoupled from oscillator core 1232 by one or more switches (switches S1, S2, S3, etc.). The frequency of the signal output from oscillator core 1250 may be adjusted by changing the capacitance of adjustable capacitor 1234, for example by switching individual capacitors between coupling to ("switched in") or decoupling from ("switched out") oscillator core 1232. For example, a tag controller or tuning circuit may reduce the frequency of the output signal from oscillator core 1250 by switching one or more capacitors in (i.e., coupling the capacitor(s) to oscillator core 1250), or may increase the frequency of the output signal by switching one or more capacitors out (i.e., decoupling the capacitor(s) from oscillator core 1250).

In some embodiments, the tuning elements and variable elements described herein (e.g., tuning element 622, adjustable impedance 1154, adjustable conductance 1156, and/or adjustable capacitor 1234) may be discretely variable, and may include one or more switched impedance elements, such as switched capacitors, switched inductors, switched transmission lines, and/or switched resistors. In these situations, the impedance of a variable element may be adjusted by switching (i.e., opening and/or closing associated switches) the impedance elements into or out of the variable element. For example, a switch such as a transistor may couple an impedance element to other impedance elements in the variable element. The impedance element may be "switched into" the variable element by closing the switch. When the switch is closed, the impedance element is electrically coupled to the other impedance elements in the variable element and contributes its impedance to the overall impedance of the variable element. The impedance element may also be "switched out of" the variable element by opening the switch. When the switch is opened, the impedance element is electrically isolated from other impedance elements in the variable element and does not contribute its impedance to the overall impedance of the variable element.

In some embodiments, tag clock frequency adjustment may affect one or more counters implemented on the tag IC. For example, a tag may use counters to track time and/or to determine the time duration of a received reader command. If tag counters increment (or decrement) based on the number of edges in the tag clock, modifying the tag clock frequency may also modify the counting rates of tag counters. These counting rate changes may be significant, especially if tag clock frequency adjustments are large.

Figure 13:
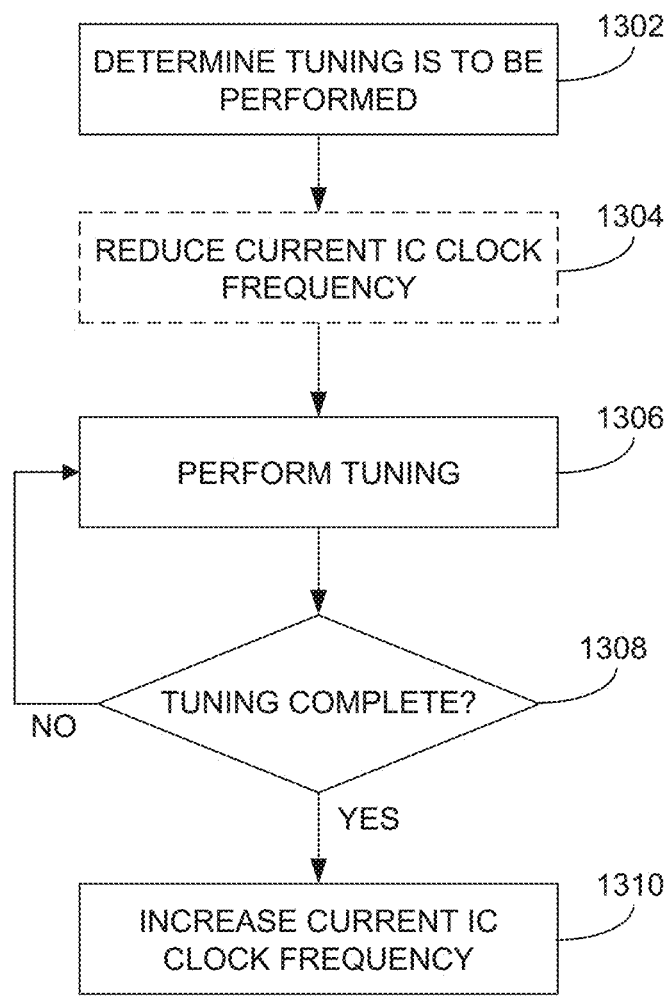
FIG. 13 is a flowchart depicting a process for operating a tag IC at a low clock frequency during an RFID tag tuning phase.

FIG. 13 is a flowchart depicting a process 1300 for operating a tag IC at a low clock frequency during an RFID tag tuning phase. Process 1300 begins at step 1302, where the IC determines that impedance matching tuning is to be performed. For example, the IC may determine that tuning is to be performed based on a schedule or timer, upon initial IC power-up, or in response to receiving a command to perform tuning. In some embodiments, the IC may determine that tuning should be performed if some tag parameter (e.g., received power, transferred power, tag operating state, environmental RF noise, or any other suitable parameter) exceeds or falls below a particular threshold or meets some particular criteria.

When the IC determines that tuning is to be performed and enters a tuning phase, at optional step 1304 the IC may first reduce its current clock frequency to a relatively low clock frequency below an MFOP, as described above. In some embodiments, a power management unit (PMU) of the IC (e.g., rectifier and PMU 441) may be responsible for determining whether tuning is to be performed and whether clock frequency is to be reduced.

For example, the IC may reduce its current clock frequency by half (50%), an order of magnitude (90%), or any suitable amount. The amount by which the IC reduces its current clock frequency may be predefined or dynamically-determined. For example, the IC may automatically reduce its current clock frequency to a predefined value when it determines that tuning is to be performed. In some embodiments, the IC may reduce its current clock frequency to one of a number of predefined reduced clock frequencies. In other embodiments, the IC may dynamically calculate a reduced clock frequency value and then reduce its clock frequency to the calculated frequency value. If the IC has just powered-up, it may power up with a relatively low current clock frequency, and thus may not need to perform optional step 1304 to reduce its current clock frequency. The IC may instead power-up with a relatively high clock frequency, determine that tuning is to be performed, and then in response reduce its clock frequency.

In some embodiments, the IC may reduce its current clock frequency by adjusting an IC oscillator, such as oscillator 1100. For example, the IC may adjust a divide ratio used to generate clock signals, an impedance or conductance associated with the oscillator, and/or a bias (current and/or voltage) of the oscillator, as described above in FIG. 11 and FIG. 12. In other embodiments, the IC may include at least two oscillators, one of which provides a clock signal with relatively low ("reduced") frequency and one of which provides a relatively-high-frequency clock signal, and may "reduce" its current clock frequency by using the relatively-low-frequency clock signal.

At step 1306, the IC then begins the impedance matching tuning process in the tuning phase. For example, the tuning process may be performed as described in commonly-assigned U.S. patent application Ser. No. 13/345,654 and Ser. No. 14/213,453 filed on Jan. 6, 2012 and Mar. 14, 2014, respectively, both of which are hereby incorporated by reference in their entireties. In some embodiments, the IC may perform the tuning process as described in FIGS. 9 and 10. At step 1308, the IC determines whether the impedance matching tuning process has been completed. If not, the IC moves back to step 1306.

On the other hand, if the IC determines that tuning has been completed, at step 1310 the IC may exit the tuning phase and increase its current clock frequency to a desired operating clock frequency greater than or equal to an MFOP in order to enter a protocol phase in which it receives and responds to reader commands according to a protocol. For example, the IC may increase its current clock frequency by 100%, by an order of magnitude, or by any suitable amount. If the IC had previously reduced its clock frequency at optional step 1304, the desired operating clock frequency may be the original clock frequency or a new clock frequency that may be higher or lower than the original clock frequency. Similar to step 1304, the IC may increase its current clock frequency by adjusting an IC oscillator, for example by adjusting an oscillator divide ratio, an oscillator impedance, an oscillator conductance, and/or an oscillator bias.

While the clock frequency reduction and increase are described above as occurring before and after the impedance matching tuning process, respectively, in some embodiments the reduction and/or increase may occur during the tuning process. For example, the IC may reduce its current clock frequency after the tuning process has started, and may also increase its current clock frequency before the tuning process has completed. In some embodiments, multiple reductions and increases may occur. For example, the IC may reduce and/or increase its current clock frequency multiple times during the tuning process. In some embodiments, if the IC determines that its current clock frequency does not need to be reduced during the tuning process, the IC may not reduce its current clock frequency at all.

The steps described in processes 900, 1000, and 1300 are for illustration purposes only. Reducing IC clock frequency before impedance matching tuning in self-tuning RFID tags may employ additional or fewer steps and in different orders using the principles described herein. Of course, the order of the steps may be modified, some steps eliminated, or other steps added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

Embodiments as described herein additionally include programs, and methods of operation of the programs. A program may be defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A Radio Frequency Identification (RFID) integrated circuit (IC) comprising:
   an antenna port configured to be coupled to an antenna and a variable impedance;
   a first oscillator configured to provide a first clock frequency;
   a second oscillator configured to provide a second clock frequency; and
   a tuning circuit coupled to and configured to tune the variable impedance, wherein the IC is configured to:
      determine that tuning of the variable impedance is to occur;
      select the first oscillator to use for the tuning;

extract a first power from an RF wave incident on the antenna insufficient for the IC to fully operate;

cause the tuning circuit to tune, using the first clock frequency from the first oscillator, the variable impedance to increase the power extracted from the RF wave; and after the tuning circuit tunes the variable impedance:

extract a second power from the RF wave sufficient for the IC to fully operate;

select the second oscillator to use for IC operation; and operate using the second clock frequency from the second oscillator.

2. The RFID IC of claim 1, further configured to determine that tuning of the variable impedance is to occur based on a received command.

3. The RFID IC of claim 1, further configured to determine that tuning of the variable impedance is to occur upon determining that the extracted first power is insufficient for the IC to fully operate.

4. The RFID IC of claim 1, further configured to determine that tuning of the variable impedance is to occur based on an IC operating state.

5. The RFID IC of claim 1, further configured to determine that tuning of the variable impedance is to occur based on an IC power-up.

6. The RFID IC of claim 1, wherein the first and second clock frequencies are different.

7. The RFID IC of claim 1, wherein the first clock frequency is below a minimum clock frequency to operate according to a protocol (MFOP).

8. A Radio Frequency Identification (RFID) integrated circuit (IC) comprising:

an antenna port configured to be coupled to an antenna and a variable impedance; and a tuning circuit coupled to and configured to tune the variable impedance, wherein the IC is configured to:

upon power-up, determine that tuning of the variable impedance is to occur and select a first clock frequency to use during the tuning;

extract a first power from an RF wave incident on the antenna;

cause the tuning circuit to tune, using the first clock frequency, the variable impedance to increase the power extracted from the RF wave; and after the tuning circuit tunes the variable impedance:

extract a second power from the RF wave higher than the first power;

select a second clock frequency higher than the first clock frequency to use for IC operation; and operate using the second clock frequency.

9. The RFID IC of claim 8, further configured to determine that tuning of the variable impedance is to occur based on a received command.

10. The RFID IC of claim 8, further configured to determine that tuning of the variable impedance is to occur upon determining that the extracted first power is insufficient for the IC to fully operate.

11. The RFID IC of claim 8, further configured to determine that tuning of the variable impedance is to occur based on an IC operating state.

12. The RFID IC of claim 8, further configured to determine that tuning of the variable impedance is to occur based on the power-up.

13. The RFID IC of claim 8, further comprising a first oscillator configured to provide the first clock frequency and a second oscillator configured to provide the second clock frequency.

14. The RFID IC of claim 8, wherein the first clock frequency is below a minimum clock frequency to operate according to a protocol (MFOP).

15. A Radio Frequency Identification (RFID) integrated circuit (IC) comprising:

an antenna port configured to be coupled to an antenna and a variable impedance; and a tuning circuit coupled to and configured to tune the variable impedance; wherein the IC is configured to:

upon power-up, extract a first power from an RF wave incident on the antenna insufficient for the IC to fully operate and determine that tuning of the variable impedance is to occur;

while extracting the first power and operating at a first clock frequency sufficient for the tuning circuit to tune the variable impedance, cause the tuning circuit to tune the variable impedance to increase the power extracted from the RF wave; and after the tuning circuit tunes the variable impedance, operate at a second clock frequency different than the first clock frequency and extract a second power from the RF wave sufficient for the IC to fully operate.

16. The RFID IC of claim 15, further configured to determine that tuning of the variable impedance is to occur based on a received command.

17. The RFID IC of claim 15, further configured to determine that tuning of the variable impedance is to occur upon determining that the extracted first power is insufficient for the IC to fully operate.

18. The RFID IC of claim 15, further configured to determine that tuning of the variable impedance is to occur based on an IC operating state.

19. The RFID IC of claim 15, further configured to determine that tuning of the variable impedance is to occur based on the power-up.

20. The RFID IC of claim 15, further comprising a first oscillator configured to provide the first clock frequency and a second oscillator configured to provide the second clock frequency.

* * * * *

UNITED STATES PATENT AND TRADEMARK OFFICE
CERTIFICATE OF CORRECTION

| | |
|---|---|
| PATENT NO. | : 10,929,734 B1 |
| APPLICATION NO. | : 16/597866 |
| DATED | : February 23, 2021 |
| INVENTOR(S) | : John D. Hyde et al. |

It is certified that error appears in the above-identified patent and that said Letters Patent is hereby corrected as shown below:

On the Title Page

Item (74) (Attorney Agent, or Firm), Line 1, Delete "Turk" and insert -- Turk, --, therefor.

In the Specification

In Column 3, Line 46, Delete "signals)" and insert -- signals). --, therefor.

In Column 12, Line 33, Delete "n" and insert -- an --, therefor.

Signed and Sealed this
Twenty-first Day of June, 2022

Katherine Kelly Vidal
*Director of the United States Patent and Trademark Office*